United States Patent [19]

Hill

[11] 4,322,988
[45] Apr. 6, 1982

[54] FLUID BRAKED PLANETARY TRANSMISSION

[76] Inventor: Charles S. Hill, 111 Foster Ave., Olney, Ill. 62450

[21] Appl. No.: 118,744

[22] Filed: Feb. 5, 1980

[51] Int. Cl.³ .................. F16H 3/44; F16H 57/10; F16D 31/04
[52] U.S. Cl. ..................................... 74/774; 74/773; 192/61
[58] Field of Search ............... 188/92; 418/58, 61 R; 192/61; 74/774, 773, 794, 802

[56] References Cited

U.S. PATENT DOCUMENTS

| | | | |
|---|---|---|---|
| 908,365 | 12/1908 | Ward | 418/187 |
| 979,272 | 12/1910 | Feller | 192/61 |
| 1,307,488 | 6/1919 | Durant | 74/774 X |
| 1,354,228 | 9/1920 | Thompson et al. | 192/61 |
| 2,072,203 | 3/1937 | Fuller | 192/61 |
| 2,330,375 | 9/1943 | Orner | 74/774 |
| 2,432,201 | 12/1947 | Lilly | 192/61 |
| 2,482,313 | 9/1949 | Bascle | 192/61 |
| 2,484,015 | 10/1949 | Cochran | 74/774 X |
| 2,652,911 | 9/1953 | Somers | 74/794 X |
| 2,730,218 | 1/1956 | Wickman | 192/61 |
| 2,830,470 | 4/1958 | Marsell | 74/774 X |
| 2,921,483 | 1/1960 | Colmerauer | 74/774 |
| 3,078,976 | 2/1963 | Whinery et al. | 192/61 |
| 3,130,607 | 4/1964 | Kraemer | 74/765 |
| 3,824,041 | 7/1974 | Rystrom | 417/310 |
| 3,966,367 | 6/1976 | Erickson | 418/58 |
| 4,138,204 | 2/1979 | Bruguera | 417/300 |

FOREIGN PATENT DOCUMENTS

| | | | |
|---|---|---|---|
| 124350 | 6/1947 | Australia | 192/61 |
| 294714 | 8/1928 | United Kingdom | 192/61 |
| 407939 | 3/1934 | United Kingdom | 192/61 |

*Primary Examiner*—Leslie Braun
*Attorney, Agent, or Firm*—O'Brien & Marks

[57] ABSTRACT

A fluid braked planetary transmission is disclosed as including a driven sun gear and a plurality of meshing planet pinions carried in a housing and adapted to act as positive displacement pumps, all but one of the pinions also being adapted to act as positive displacement motors. The pump outlets are restricted by an automatic valve to resist rotation of the pinions whereby the housing is rotated, with controlled slippage, by rotation of the sun gear. Pressurized fluid is recirculated to the pinions acting as motors to recoup hydraulic energy which would otherwise be lost.

6 Claims, 5 Drawing Figures

FLUID BRAKED PLANETARY TRANSMISSION

BACKGROUND OF THE INVENTION

1. Field of the Invention:

This invention relates to planetary transmissions, particularly to those in which hydraulic fluid is used to brake the rotation of planet pinions to permit slippage while transferring torque between input and output means over a continuous range of input/output speed ratios.

2. Description of the Prior Art:

The prior art, exemplified by U.S. Pat. No. 2,330,375, discloses fluid braked planetary transmissions in which positive displacement gear pumps displace a fluid, the flow of which is restricted by manual or automatic valves to permit controlled slippage between input and output members. In such devices, the flow of fluid through a static restriction dissipates hydraulic energy in the form of heat, resulting in less than optimal mechanical efficiency.

Although it is known, for example in U.S. Pat. No. 3,966,367, to use planetary gears as either hydraulic pumps or motors, the applicant is not aware of any planetary transmission in which gear pumps may act simultaneously as motors to recoup pumping energy from hydraulic fluid.

SUMMARY OF THE INVENTION

The invention is summarized as a planetary transmission including a housing, rotary coupling means attached to the housing, a sun gear rotatably supported within the housing, a a shaft attached to the sun gear, a plurality of planet pinions rotatably supported within the housing in mesh with the sun gear whereby the pinions tend to rotate on their axes as the shaft rotates with respect to the housing, hydraulic brake means for resisting rotation of the pinions whereby torque is transferred between the shaft and the housing, and means for recovering mechanical energy from the hydraulic brake means.

An object of this invention is to construct a fluid braked planetary transmission having high mechanical efficiency.

Another object of the invention is to recover energy from a pressurized fluid in a fluid braked transmission by means of positive displacement hydraulic motors.

It is a further object of the invention to provide a planetary transmission having positive displacement pumps and motors in series, wherein the total displacement of the pumps exceeds that of the motors.

Still another object of the invention is to control automatically the resistance to fluid flow in a fluid braked planetary transmission.

Another object of the invention is to bleed automatically excess fluid from the hydraulic circuit in a planetary transmission to a fluid reservoir.

DESCRIPTION OF THE PREFERRED EMBODIMENT

Figure 1:
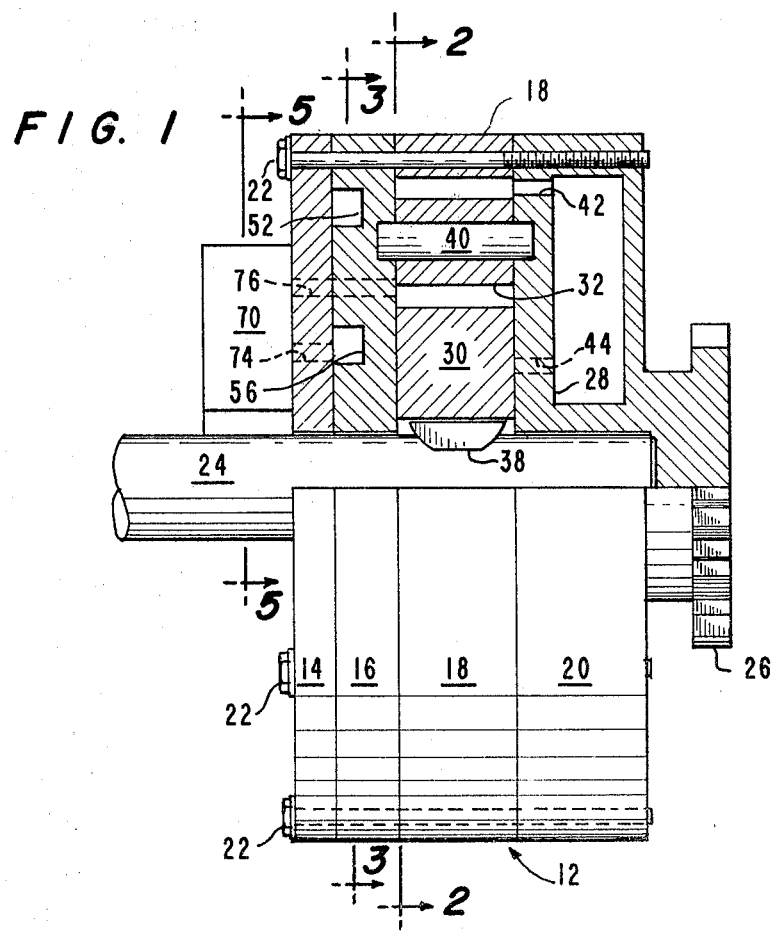
FIG. 1 is a side elevation with parts in section of a planetary transmission assembly embodying the present invention.

Referring to FIG. 1, the invention is embodied in a planetary transmission assembly including a circular housing designated generally as 12 having a cover plate 14, a manifold section 16, a gearset carrier 18 and a reservoir section 20, which have flat mating surfaces and are held together by appropriate means such as eight through bolts 22. A shaft 24 is journalled within the housing 12, radial and axial clearances being maintained around the shaft 24 so that it may rotate freely within the housing 12. Conventional bushing, seals and lubricating means (not shown) may be provided as required.

The reservoir section 20 has rotary coupling means such as an integral spline 26 for coupling the housing 12 to an associated device (not shown), and defined within the reservoir section 20 is an annular cavity or reservoir 28 for holding a reserve of hydraulic fluid.

Figure 2:
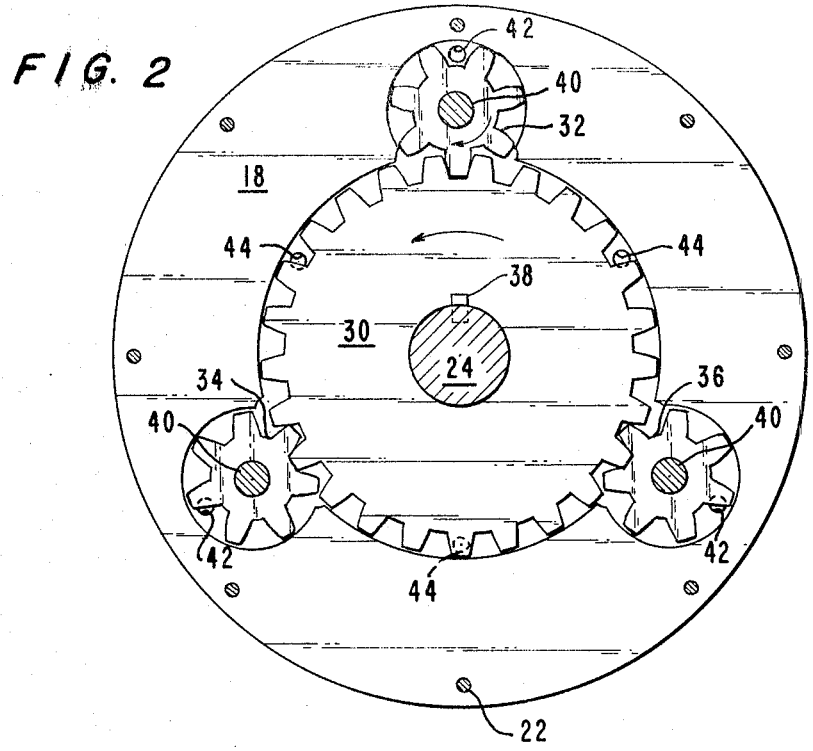
FIG. 2 is a cross-sectional view taken along the line 2—2 in FIG. 1.

As shown in FIGS. 1 and 2, the gear carrier 18 houses a planetary gearset including a sun gear 30 and three planet pinions 32, 34 and 36 in constant mesh therewith. Although three pinions are preferred, only two pinions are required to practice the invention, and a greater number may be used. The sun gear 30 and the pinions 32, 34 and 36 are closely enveloped by the carrier 18, so that the gaps between gear teeth form substantially sealed compartments. The sun gear 30 is mounted on the shaft 24, and is secured against rotation thereon by a key 38.

Each of the pinions 32, 34 and 36 is rotatably supported by a pinion shaft 40, the ends of which are supported by the manifold section 16 and the reservoir section 20. Referring to FIG. 2, the teeth of the pinions 32, 34 and 36, and of the sun gear 30 sweep annular volumes which are vented to the oil reservoir 28 via holes 42 and 44 respectively in the reservoir section 20. Each of the pinions 32, 34 and 36, in cooperation with the sun gear 30, is adapted to act as a rotary pump, an oil outlet port 46 being located in the manifold section 16 adjacent the point at which the teeth of each pinion enter meshing contact with the sun gear 30. The outlet ports 46 provide exits for fluid displaced from the gaps between teeth by the teeth of an opposing gear. As discussed in detail below, the flow of fluid is restricted in order to exert a hydraulic braking force on the pinions to cause the housing 12 to rotate with the sun gear 30.

Two of the pinions 34 and 36, in cooperation with the sun gear 30, are adapted to act as fluid motors as well as pumps, and an inlet port 48 extends through the manifold section 16 adjacent the unmeshing points of the pinions 34 and 36 to admit fluid under pressure to the gaps between teeth as the gears unmesh. One pinion 32 lacks a pressurized fluid port 48 and acts as a pump only. Since there are more pumps than motors, hydraulic fluid is supplied to the motors in excess of their needs, allowing for leakage losses while maintaining fluid pressure, which would not be possible if there were an equal number of pumps and motors. Excess fluid flow is relieved as described hereafter.

While it is preferred to have three pumps and two motors, the invention can be practiced using any number of pumps and motors, as long as there are more pumps than motors, best efficiency being obtained when the number of motors is one less than the number of pumps.

Figure 3:
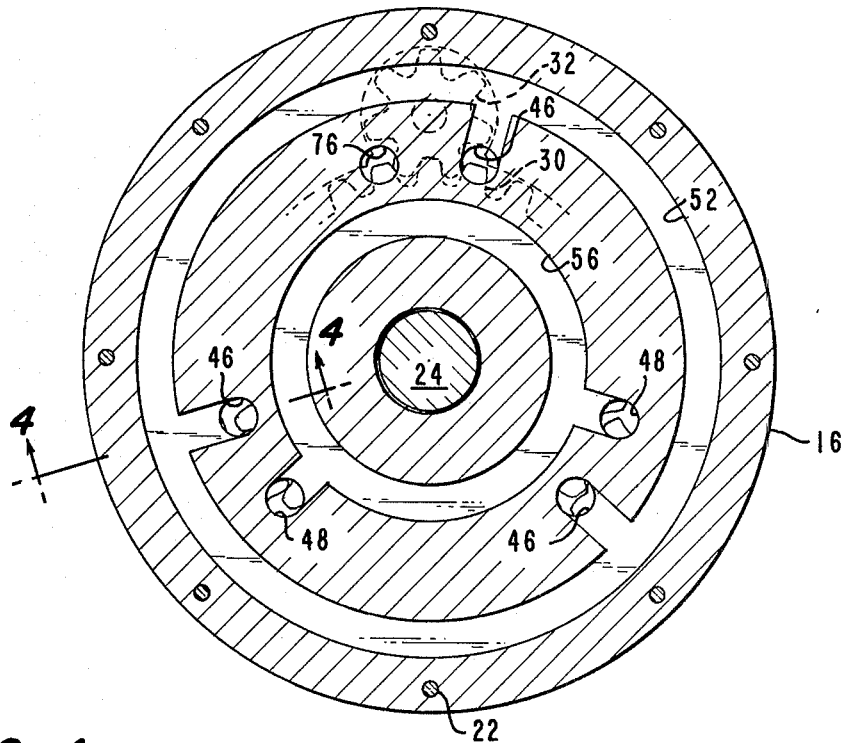
FIG. 3 is a cross-sectional view taken along the line 3—3 in FIG. 1.
Figure 4:
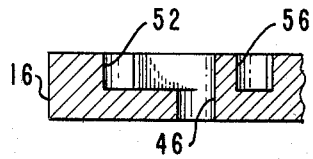
FIG. 4 is a partial cross-sectional view taken along the line 4—4 in FIG. 3.

As shown in FIGS. 3 and 4, the three outlet ports 46 extend through the manifold section 16 to a common annular primary chamber 52 machined in the face of the manifold section 16 adjacent the cover plate 12. The inlet ports 48 likewise extend through the manifold section 16 to a common secondary chamber 56 machined in the manifold section 16 concentric with the primary chamber 52. While it is preferred that the manifold chambers 52 and 56 be defined within the housing 12, they could be external and could be connected to cooling means (not shown) if necessary.

The exterior of the housing 12 supports a control valve 58 (FIG. 5) having a first pot 62 extending through the cover plate 14 to the primary chamber 52, and a second port 64 extending through the cover plate 14 to the secondary chamber 56. A variable resistance to flow is provided by a spool 66 in the control valve 58 which is laterally movable between the ports under the opposing forces of a compression coil spring 68 and hydraulic pressure from the first port 62, whereby the valve operates in response to changes in pressure in the primary chamber 52.

The cover plate 14 also supports a relief valve 70 which has a first hole 72 extending through the cover plate 14 to the primary chamber 52, a second hole 74 that extends through the cover plate 14 to the secondary chamber 56, and a relief port 76 which extends through both the cover plate 14 and the manifold section 16 to the unmeshing point of the pinion 32. Flow from the second hole 74 to the relief port 76 is variably restricted by a spring-centered spool 78 that is moved laterally by opposing hydraulic pressures of the primary and secondary chambers 52 and 56.

In operation, the shaft 24 is rotated counterclockwise with respect to the housing 12, as shown by the arrow in FIG. 2, causing the sun gear 30 to turn the pinions 32, 34 and 36 clockwise around their shafts 40. As long as the pinions 32, 34 and 36 are free to rotate, no torque is transferred between the shaft 24 and the housing 12, and the housing 12 may remain stationary. In order to couple the shaft 24 with the housing 12, it is necessary to provide a braking force against rotation of the pinions 32, 34 and 36, and this is accomplished hydraulically as described below.

As the gears rotate, fluid in the cavity 28 moves through the holes 42 and 44 to fill the gaps between the gear teeth, the trapped fluid being carried by the gear teeth toward a meshing junction with a mating gear. As the teeth mesh, fluid is displaced from the gaps through the outlet ports 46 and into the primary chamber 52. If this flow were unrestricted, the pinions would rotate freely, without transferring torque between the shaft 24 and the housing 12; however, the control valve 58 resists flow through the chamber 52, creating pressure at the pump outlets 46 that opposes rotation of the pinions. The effect of the control valve 58 on the pinions is that of a hydraulic brake which transfers torque from the shaft 24 to the housing 12 while allowing slippage between the two. Although the shaft 24 has been described as the input means, the invention could be used equally well in reverse fashion, with the housing 12 driving the shaft 24.

Figure 5:
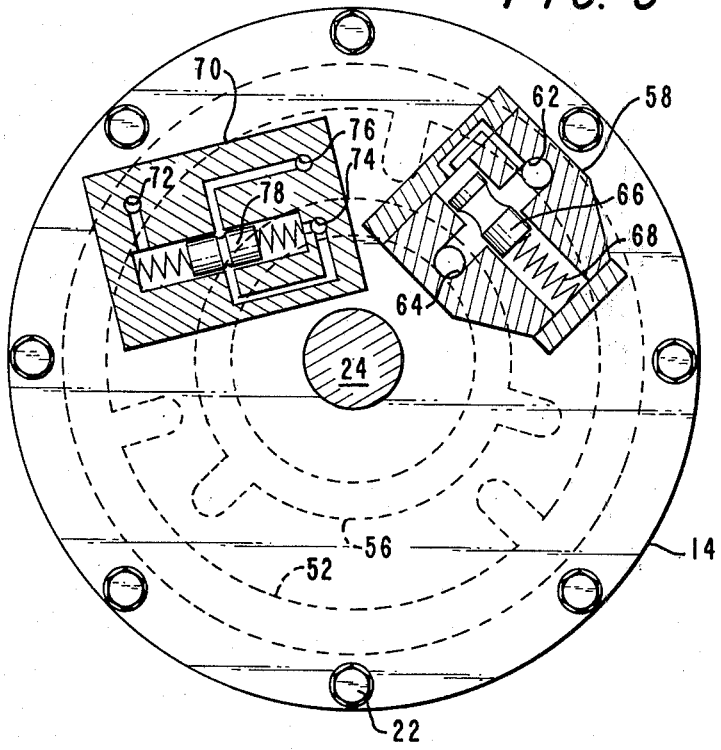
FIG. 5 is a cross-sectional view taken along the line 5—5 in FIG. 1.

Referring to FIG. 5, it can be seen that the only path by which fluid from the pumps can leave the primary chamber 52 is through the control valve 58, past the spool 66. Depending on the bias of the spring 68, the control valve 58 opens at a predetermined primary chamber pressure, whereupon fluid passes from the primary chamber 52 to the secondary chamber 56, creating pressure therein.

Rather than dissipating the fluid's energy by passing it through a fixed restriction such as an orifice to return it to reservoir pressure before recycling the fluid to the pumps, a portion of the fluid entering the secondary chamber 56 is directed to the unmeshing side of the two pinions 34 and 36 adapted to act as motors. This high pressure fluid enters the inlet ports 48 at the pinions 34 and 36 to transfer hydraulic energy -that would otherwise be lost- into useful mechanical work before returning to reservoir pressure by means of vent holds 42 and 44.

Since there are more pumps than motors, excess flow is developed which must be relieved in order to prevent pressure build-up in the secondary chamber 56, which would negate the effect of the control valve 58. Therefore, the relief valve 70 is set to open when the secondary chamber pressure reaches a predetermined level, allowing fluid from the secondary chamber 56 to enter the relief port 76, recycling the fluid to low pressure at the unmeshing junction of the pump-only pinion 32.

An advantage of the invention is that there is always an ample supply of hydraulic fluid to drive the pinions acting as motors; moreover, excess fluid is automatically relieved.

Another advantage of the invention is that pinion braking is automatically regulated to obtain controlled slippage between the transmission input and output.

Inasmuch as the invention is subject to many variations, modifications and changes in detail, it is intended that all matter contained in the foregoing description or shown on the accompanying drawings shall be interpreted as illustrative and not in a limiting sense.

What is claimed is:

1. A fluid braked planetary transmission comprising
a housing,
rotary coupling means attached to the housing,
a sun gear rotatably supported within the housing,
a shaft attached to the sun gear,
a plurality of planet pinions rotatably supported within the housing in mesh with the sun gear whereby the pinions tend to rotate on their axes as the shaft rotates with respect to the housing,
hydraulic brake means for resisting rotation of the pinions whereby torque is transferred between the shaft and the housing,
means for recovering mechanical energy from the hydraulic brake means,
a gearset carrier that closely envelops the sun gear and the pinions to confine gaps between the teeth of both the sun gear and the pinions,
means for filling the gaps with hydraulic fluid,
the housing having an outlet port adjacent each pinion positioned so as to receive hydraulic fluid displaced from the gaps by meshing of the pinions with the sun gear whereby each pinion may act as a hydraulic pump,
the hydraulic brake means restricting flow from the pumps to create back pressure that resists rotation of the pinions,
wherein the means for recovering mechanical energy includes at least one positive displacement hydraulic motor in series with the pumps, wherein the housing defines an inlet port adjacent the unmeshing junction of at least one of the pinions whereby each pinion having an inlet port acts as a hydraulic motor, and wherein the number of pinions acting as hydraulic motors is less than the number of pinions acting as hydraulic pumps.

2. A planetary transmission as recited in claim 1, wherein the hydraulic brake means includes a control valve adapted to regulate flow between the motors and the pumps.

3. A planetary transmission as recited in claim 2, wherein the control valve includes an axially movable spool responsive to pump pressure so as to limit pump pressure to a predetermined maximum.

4. A planetary transmission as recited in claim 3, further including
 a primary manifold connected to the outlet ports of the pumps, and
 a secondary manifold connected to the inlet ports of the motors,
 the control valve being the only means of fluid communication between the primary and secondary manifolds.

5. A planetary transmission as recited in claim 3, wherein the shaft is rotated and drives the housing.

6. A planetary transmission as recited in claim 3, wherein the housing is rotated and drives the shaft.

* * * * *